United States Patent
Yi

(10) Patent No.: US 6,223,558 B1
(45) Date of Patent: May 1, 2001

(54) METHOD OF REFRIGERATION PURIFICATION AND POWER GENERATION OF INDUSTRIAL WASTE GAS AND THE APPARATUS THEREFOR

(76) Inventor: Yuanming Yi, 5# Jiangwan Xin Chun, Li Ling City, Hunan Province (CN), 412200

(*) Notice: Subject to any disclaimer, the term of this patent is extended or adjusted under 35 U.S.C. 154(b) by 0 days.

(21) Appl. No.: 09/530,344
(22) PCT Filed: Oct. 23, 1998
(86) PCT No.: PCT/CN98/00252
  § 371 Date: Apr. 26, 2000
  § 102(e) Date: Apr. 26, 2000
(87) PCT Pub. No.: WO99/22186
  PCT Pub. Date: May 6, 1999

(30) Foreign Application Priority Data

Oct. 27, 1997 (CN) .................................................. 97119918

(51) Int. Cl.[7] .................................................. F25J 1/02
(52) U.S. Cl. .................................................. 62/623; 62/434
(58) Field of Search .................................. 62/434, 630, 623, 62/620

(56) References Cited

U.S. PATENT DOCUMENTS 4,343,633 * 8/1982 Kick et al. ................................ 62/23
4,738,699 * 4/1988 Apffel ..................................... 62/11
5,461,870 * 10/1995 Paradowski ............................. 62/11

* cited by examiner

Primary Examiner—Corrine McDermott
Assistant Examiner—Malik N. Drake
(74) Attorney, Agent, or Firm—Jenkens & Gilchrist, P.C.

(57) ABSTRACT

This invention relates to a method of refrigeration purification and power generation of industrial gas and apparatus therefor. The apparatus is comprised of two parts, the front part of which is constituted by a multi-stage phase changeable refrigeration cycle of pure-phase changeable non-heat refrigeration technique for effectively obtaining cool quantity; the rear part of which makes use of the feature that the toxic and harmful gas in the waste gas has the higher boiling point than clean gas, the waste gas is firstly condensed and liquefied to be separated; the liquefied clean gas and the liquid refrigeration medium of the last stage absorb heat from waste gas in order to be evaporated into steam to drive expansion turbine groups respectively to work, while collecting a mechanical power in a negative compression region and adding a mechanical energy loss of initial cooled waste gas during compression. The invention can thoroughly remedy the effect of the industrial waste gas on polluting the atmosphere and effectively generate power.

3 Claims, 1 Drawing Sheet

METHOD OF REFRIGERATION PURIFICATION AND POWER GENERATION OF INDUSTRIAL WASTE GAS AND THE APPARATUS THEREFOR

INVENTION BACKGROUND

The present invention relates to the environmental protection and electric power industry, especially to the method and the apparatus of deep refrigeration purification of industrial waste gas, in particular the furnace flue gas, and electric power generation with utilizing heat energy work of the waste gas.

Waste gas discharged in modern industrial production seriously pollutes the atmosphere. Toxic and harmful gaseous constituents in the waste gas threaten human survival. Apparently, worldwide environmental protection is very important and the conventional technical solutions for solving the industrial waste gas pollution are only limited to the methods of smoke prevention, dust control and simple desulphurization or the like to abate pollution. Up to now, mostly all of the industrial furnace waste gas is discharged to the atmospheric space relying in the manner that the pollutants are directly discharged into atmospheric layer by adopting chimneys.

OBJECT OF THE INVENTION

The object of the invention is to provide a new method and the apparatus of refrigeration purification and power generation of industrial waste gas. It adopts pure-phase changeable non-heating refrigeration technique for obtaining high efficiency deep cool quantity, and makes use of deep cool quantity to liquefying toxic and harmful constituents in the waste gas firstly to separate clean gas from toxic and harmful constituents, to thoroughly purify the industrial waste gas, and makes use of the heat energy of the industrial waste gas to generate electric power.

BRIEF OF INVENTION

The technical solution according to the invention as follows:

A method of refrigeration purification and power generation of industrial waste gas wherein a front part is comprised of double stages or above multi-stage refrigeration cycle of the pure-phase changeable non-heating refrigeration technique, high efficiency deep cool quantity being prepared by the method of the pure-phase changeable non-heating refrigeration; Hot waste gas introduced into a rear part is progressively cooled by stages with the use of the deep cool quantity, with the use of the feature that the liquefying boiling temperatures of the toxic and harmful constituents in the waste gas are all higher than the boiling temperature of the clean oxygen and nitrogen, the waste gas is firstly liquefied by stages in its corresponding boiling temperature region in the respectively refrigerating stairs to completely separate with the clean gas and then respectively be collected as raw material; At the same time, with the use of the last stage phase change in the method of the last stage of the pure-phase changeable non-heating refrigeration technique to cool a refrigeration medium in the refrigeration cycle, the refrigeration medium, on one hand, releases sensible cool and latent cool to final liquefy the clean gaseous constituents in the industrial waste gas and, on the other side, absorbs heat thereon and is evaporated into high-temperature saturated steam to drive expansion turbine for power generation, and then the refrigeration medium of the last stage is cooled down and depressurized after turbining and enters into condensing space at the end of last stage refrigeration cycle to be reliquefied; At the same time, with the use of the fully liquefied clean gas in the industrial waste gas as medium, it absorbs heat from hot waste gas continuously entering into high temperature stage and evaporates into high-pressure steam to drive expansion turbine for electric power generation, the high-pressure clean gas are depressurized, cooled down and discharged freely after passing the expansion turbine; At the same time, the initial cooled industrial waste gas flow after rapid heat exchanged with deep refrigerating clean gas is being mechanically compressed to increase its density and temperature for providing heat in rapid evaporation of the refrigeration medium of the last stage into high-temperature saturated steam; At the same time, with the use of the pressure difference between a negative pressure generated in rapid cooling of hot industrial waste gas flow after being introduced into rear part and the normal pressure of the hot industrial waste gas flow before being introduced into rear part, and with the use of a work energy formed between the pressure difference and hot industrial waste gas flow, a mechanical motion is generated via wind turbine for the kinetic energy complement in the process of mechanical compression of the initial cooled industrial waste gas flow.

A apparatus of refrigeration purification and power generation of industrial waste gas, wherein a front part of which is comprised of double stages or above multi-stage refrigeration cycle of the pure-phase changeable non-heating refrigeration technique, high efficiency deep cool quantity being prepared by the apparatus of the pure-phase changeable non-heating refrigeration; A rear part of which is comprised of a rear insulating pressure vessel, a medium pump, heat exchangers mounted in the rear insulating pressure vessel as same as those in the last stage refrigeration cycles of the front part, motor, a axial flow wind turbine, a centrifugal air compressor, dust and smoke collectors and liquid waste gas collectors, and expansion turbine groups and a electric power generator group; A isolation layer is provided in the mid of said rear insulating pressure vessel where the upper side of the isolator layer is a negative pressure cooling region and the lower side of the isolator layer is a pressurized cooling region; Said heat exchangers are respectively installed inside the negative pressure cooling region and the pressurized cooling region, the motor being transmission-linked to the centrifugal air compressor and the axial flow wind turbine via coupling shaft; Said axial flow wind turbine is installed in an inlet of the negative pressure-cooling region and a first dust and smoke collector is further mounted at the inlet, hot industrial waste gas being introduced into the rear part insulating pressure vessel to drive blades of the axial flow wind turbine for centrifugal separating the dust and smoke which is initially collected; Said centrifugal air compressor is installed on the isolation layer, namely, mounted on an inlet of the pressurized cooling region, a second dust and smoke collector being further mounted at the inlet, dust and smoke being centrifugal separated and collected again; Said liquid waste gas collectors are respectively provided in the interspace of the heat exchangers inside the negative pressure cooling region and the pressurized cooling region so that the condensed and liquefied toxic and harmful constituents are respectively collected as raw material where oxygen and nitrogen constituents in the waste gas are finally condensed as liquid and stored at the bottom of the pressurized cooling region of rear part insulating pressure vessel; Said medium pump is connected to an inlet pipe of the heat exchanger in the negative pressure-cooling region via a first insulating pressure pipe, an outlet pipe of the heat exchanger in the negative pressure-cooling region being connected to the first expansion turbine group via a second insulating pressure pipe, an inlet pipe of the heat exchanger in the pressurized cooling region being connected to medium pump in the front part last stage of refrigeration cycle via a medium delivery pipe, an outlet pipe of the heat exchanger in the pressurized cooling region being connected to the second expansion turbine group via an insulating return pipe; Said first and second expansion turbine groups are respectively linked to the electric power generator group via coupling shafts, another end of the first expansion turbine group being a clean gas outlet where an another end of the second expansion turbine group being connected to refrigerating space in the front part last stage of refrigeration cycle via a second insulating return pipe.

The present invention is that industrial waste gas is introduced into the said apparatus and progressively cooled by stages into deep refrigeration low temperature so that the toxic and harmful constituents in the industrial waste gas are respectively condensed into liquid in the corresponding temperature region. The toxic and harmful liquefied waste gas constituents collected therein are used as chemical raw material and the remainders in the waste gas are the clean gases such as oxygen and nitrogen that can be condensed and liquefied at last. Hence, the waste gas is thoroughly purified. The industrial waste gas in the cooling-condensing process with the use of the deep refrigeration return technology to repeatedly use the cool quantity.

The apparatus according to present invention not only makes use of the work energy carried by hot industrial waste gas between normal temperature and high temperature to generate electric power but further makes use of work energy thereof between low temperature to normal temperature to generate electric power. Thus, it has a high heat engine efficiency. The present invention utilizes the utmost decreased temperature difference between evaporating temperature of the evaporator and condensing environmental temperature of condenser in the steam compression refrigeration cycle to permit the first stage of refrigeration cycle to provide for deep refrigeration up to higher cool quantity. At the same time, adopting the new refrigeration cycle technology of multi-stage pure phase change to cool so as to provide enough deep cool quantity for deep refrigeration purification of industrial waste gas, in particular the furnace flue gas, and electric power generation.

BRIEF DESCRIPTION OF DRAWING

The present invention will be described hereinafter in detail with reference to the accompanying drawing.

EMBODIMENT DESCRIPTION

Figure 1:
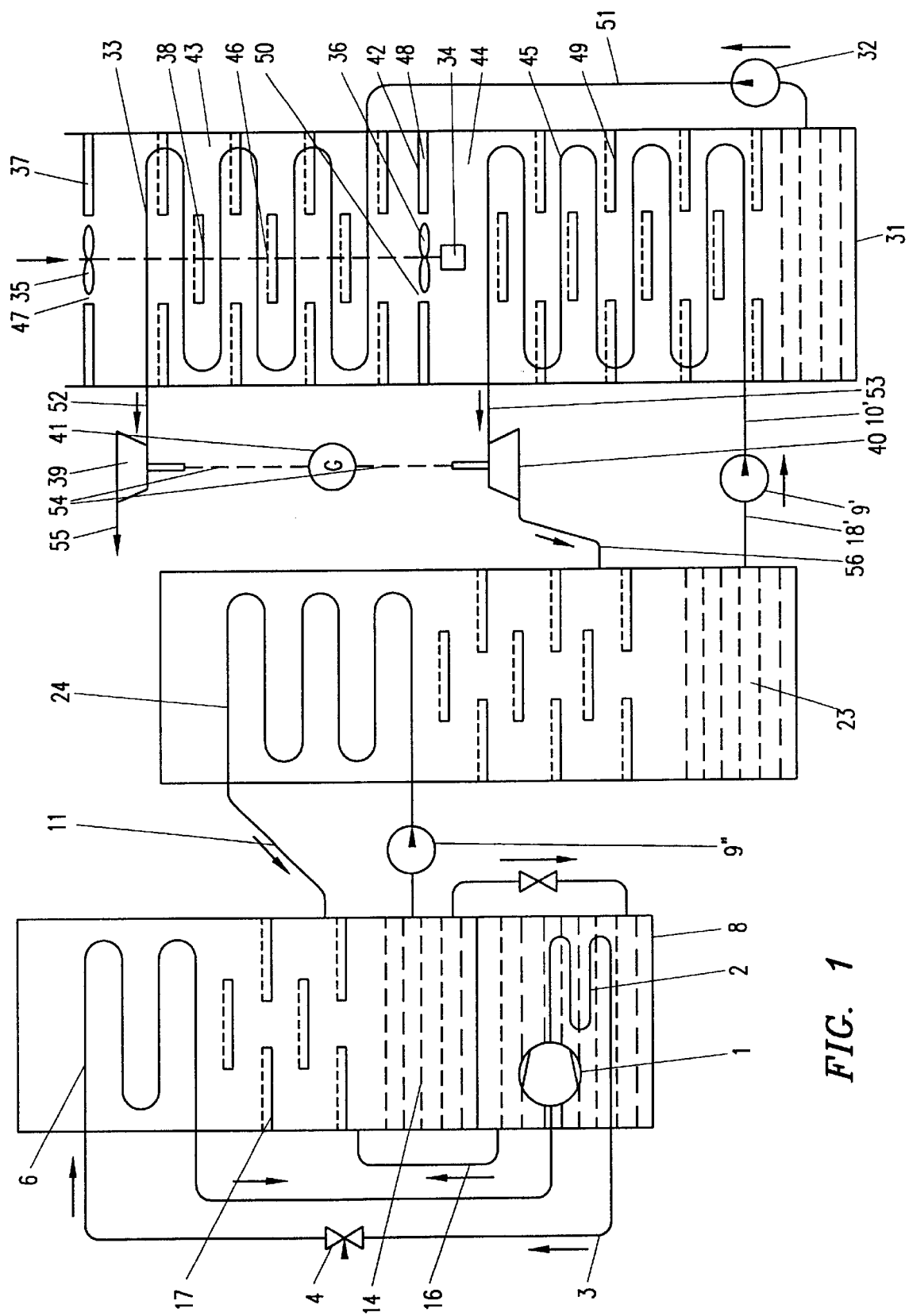

FIG. 1 shows a schematic diagram of the method of refrigeration purification and power generation of industrial waste gas and the apparatus thereof.

Referring to FIG. 1, in a first insulating pressure vessel 8 of the front part of the pure-phase changeable non-heating refrigeration apparatus, a refrigerating compressor 1, a condenser 2, a flow regulator 4 and a evaporator 6 are mounted, hence comprise an first stage of steam compression refrigeration cycle. Since the refrigerating compressor 1 and the condenser 2 are immersed in liquid refrigeration medium 14, their heat generated will be dissipated as the evaporation latent heat of the liquid refrigeration medium 14 during evaporation after the first stage refrigeration cycle is initialized. The temperature different between evaporating temperature of the evaporator 6 and condensing temperature of condenser is so small that the first stage refrigeration can have higher refrigerating efficiency in refrigeration and refrigeration supply. Steam generated by the heat dissipated in the refrigerating compressor 1 and the condenser 2 passes through vent pipe 16 and enters into the condensing space comprised of super-cooled medium condensing plates 17 and evaporator 6 as super-cooled liquid medium. A medium pump 9" pumps the liquid refrigeration medium 14 into a intermediate stage evaporator 24 to permit it to absorb heat from the return steam of the intermediate stage refrigeration cycle and evaporate. The evaporated refrigeration medium is returned to condensing space inside the first insulating pressure vessel 8 via insulating return pipe 11 and condensed into super liquid medium and cycling use when cooling.

A rear part is comprised of a rear insulating pressure vessel 31, a medium pump 32, heat exchangers 33, 45 mounted in the rear insulating pressure vessel 31, a motor 34, a axial flow wind turbine 35, a centrifugal air compressor 36, dust and smoke collectors 37, 48 and liquid waste gas collectors 38, 49, and expansion turbine groups 39, 40 and an electric power generator group 41.

A isolation layer 42 is provided in the mid of the rear insulating pressure vessel 31 where the upper side of the isolator layer 42 is a negative pressure cooling region 43 and the lower side of the isolator layer 42 is a pressurized cooling region 44. The heat exchangers 33, 45 are respectively installed inside the negative pressure cooling region 43 and the pressurized cooling region 44. The motor 34 is transmission-linked to the centrifugal air compressor 36 and the axial flow wind turbine 35 via coupling shafts 46.

The axial flow wind turbine 35 is installed in an inlet 47 of the negative pressure-cooling region 43 and a first dust and smoke collector 37 is further mounted at the inlet 47. Hot industrial waste gas is introduced into the rear part insulating pressure vessel 31 and drives blades of the axial flow wind turbine 35 to centrifugal separate the dust and smoke which is initially collected.

The centrifugal air compressor 36 is installed on the isolation layer 42, namely, mounted on an inlet 50 of the pressurized cooling region 44. A second dust and smoke collector 48 is further mounted at the inlet 50. Dust and smoke is centrifugal separated and collected again.

The liquid waste gas collectors 38, 49 are respectively provided in the interspace of the heat exchangers 33, 45 inside the negative pressure cooling region 43 and the pressurized cooling region 44. The liquid waste gas collectors 38, 49 are two or more layers alternating-arranged liquid waste gas collecting plates so that the condensed and liquefied toxic and harmful constituents are respectively collected as raw material where clean gaseous oxygen and nitrogen constituents in the waste gas are finally condensed as liquid and stored at the bottom of the pressurized cooling region 44 of rear part insulating pressure vessel 31.

The medium pump 32 is connected to an inlet pipe of the heat exchanger 33 in the negative pressure-cooling region 43 via a first insulating pressure pipe 51. An outlet pipe of the heat exchanger 33 in the negative pressure-cooling region 43 is connected to the first expansion turbine group 39 via a second insulating pressure pipe 52. The first expansion turbine group 39 is a high-pressure expansion turbine group. An inlet pipe of the heat exchanger 45 in the pressurized cooling region 44 is connected to medium pump 9' in the front part last stage of refrigeration cycle via a medium delivery pipe10'. An outlet pipe of the heat exchanger 45 in the pressurized cooling region 44 is connected to the second expansion turbine group 40 via an insulating return pipe 53. The second expansion turbine group 40 is a low-pressure expansion turbine group.

The first expansion turbine group 39 and second expansion turbine group 40 are respectively linked to the electric power generator group 41 via coupling shafts 54. Another end of the first expansion turbine group 39 is a clean gas outlet 55 where an another end of the second expansion turbine group 40 is connected to refrigerating space in the front part last stage of refrigeration cycle via a second insulating return pipe 56.

During the operation of the present invention, the medium pump 9' is initialized. The liquid refrigeration medium 23 is permitted to enter into heat exchanger 45 in the pressurized cooling region 44 inside the rear part insulating pressure vessel 31 via suction liquid pipe 18', medium pump 9' and medium delivery pipe10' such that the liquid refrigeration medium 23 absorbs heat from the entering waste gas and evaporate to form high pressure steam. It then enters into the second expansion turbine group 40 via the first insulating return pipe 53 to turbine and form low pressure, low temperature steam. It then returns back to refrigerating space inside the front part last stage refrigeration cycle via the second return pipe 56 and is condensed as liquid refrigeration medium 23.

In the first stage of steam compression refrigeration cycle, which comprised of the refrigerating compressor 1, the condenser 2, the flow regulator 4 and the evaporator 6, a refrigeration medium is introduced. The boiling point of refrigeration medium with those of liquid refrigerating media 14, 23 is progressively increased according to its connecting sequences. The evaporation temperature of liquid refrigeration medium 23 inside the rear part insulating pressure vessel 31 is below deep refrigerating temperature.

As the deep refrigerating, low temperature cool quantity is generated in the heat exchanger 45 inside the rear part insulating pressure vessel 31, negative pressure region occurs inside the rear part insulating pressure vessel 31 so that the industrial waste gas flow is naturally entered the rear part insulating pressure vessel 31. Motor 34 is initialized to permit the centrifugal air compressor 36 to mechanically compress the waste gas. The waste gas constituents are completely condensed and liquefied. The firstly liquefied toxic and harmful constituents are collected by liquid waste gas collector 38. The non-toxic and non-harmful constituents oxygen and nitrogen constituents in the waste gas are as deep refrigerating liquid stored at the bottom of the pressurized cooling region 44 of rear part insulating pressure vessel 31.

The medium pump is initialized, clean gas, comprising oxygen and nitrogen constituents in the deep refrigeration status, is pumped into the heat exchanger 33 inside the negative pressure cooling region 43 via the first insulating pressure pipe 51 so as to absorb heat from hot waste gas and rapidly evaporated into high pressure steam. It then enters the first expansion turbine group 39 via the second insulating pressure pipe 52 to become normal temperature and pressure, non-toxic and non-harmful clean gas which is freely discharged.

As the heat exchanger 33 inside the rear part insulating pressure vessel 31 refrigerates and absorbs heat, negative pressure region occurs in the upper part of the rear part insulating pressure vessel 31. When hot waste gas passes through the axial flow wind turbine 35, this generates motion that is transmitted to drive the centrifugal air compressor 36 via coupling shaft 46. When hot waste gas passes through the axial flow wind turbine 35, the carried dust and smoke is thrown into the first dust and smoker collector 37 by the action of centrifugal force. The toxic and harmful constituents in waste gas are cooled by heat exchanger 33 and respectively condensed in its corresponding boiling temperature region into liquid state. They are collected by liquid waste gas collector 38 and then concentrated and discharged as chemical raw materials.

The industrial waste gas in the negative pressure cooling region inside rear part insulating pressure vessel 31 has been cooled and the pressure is decreased, suitable pressure and temperature increase with the use of the centrifugal air compressor 36. On one side, the flow rate of waste gas entering the axial flow wind turbine 35 is increased. On the other side, the density and temperature of the waste gas inside the pressurized cooling region 44 of the rear part insulating pressure vessel 31 is increased. This facilitates the rapid absorption and evaporation of the liquid refrigeration medium 23 via heat exchanger 45 to form as pressure steam. At the same time, the liquefying speeds of the non-harmful constituents waste gas in the pressurized cooling region 44 inside the rear part insulating pressure vessel 31 is greatly increased.

When the industrial waste gas was entering the centrifugal air compressor 36, the remaindering dust and smoke in waste gas is thrown into the second dust and smoker collector 48 by the action of centrifugal force and then concentrated and discharged.

The high pressure steam enters the first expansion turbine group 39 via the second insulating pressure pipe 52 to turbine-actuate and drive electric power generator 41 to generate electrical via coupling shaft 54.

In order to increase the density and flow rate of the waste gas inside the pressurized cooling region 44, the motor 44 and the centrifugal air compressor 36 are provided on the intermediate isolation layer 42 of the rear part insulating pressure vessel 31 to suitably pressurize the waste gas flow. The energy dissipated is partly supplemented by the motion generated in the axial flow wind turbine 35 and partly supplemented by electricity. From this, the waste gas flow initially cooled in the negative pressure-cooling region is pressurized while its temperature rise is further produced, this newly added energy makes the expansion turbine group generate more electric power.

The apparatus manufactured according to the present invention is compact and can be fixedly mounted at the arena of discharging industrial waste gas. It can also be manufactured as portable apparatus that is easy transferable. It is supplementary used for the areas producing industrial waste gas such as industrial furnaces, kiln furnaces, chemicals production station, and alike to thoroughly remedy the effect of industrial waste gas for the atmospheric layer pollution, high effectively develop and utilize the heat in the industrial waste gas for electric power generation.

What is claimed is:

1. A method of refrigeration purification and power generation of industrial waste gas wherein a front part is comprised of double stages or above multi-stage refrigeration cycle of the pure-phase changeable non-heating refrigeration technique, high efficiency deep cool quantity being prepared by the method of the pure-phase changeable non-heating refrigeration, characterizing in that, hot waste gas introduced into a rear part is progressively cooled by stages with the use of the deep cool quantity, with the use of the feature that the liquefying boiling temperatures of the toxic and harmful constituents in the waste gas are all higher than the boiling temperature of the clean oxygen and nitrogen, the waste gas is firstly liquefied by stages in its corresponding boiling temperature region in the respectively refrigerating stairs to completely separate with the clean gas and then respectively be collected as raw material; At the same time, with the use of the last stage phase change in the method of the last stage of the pure-phase changeable non-heating refrigeration technique to cool a refrigeration medium in the refrigeration cycle, the refrigeration medium, on one hand, releases sensible cool and latent cool to final liquefy the clean gaseous constituents in the industrial waste gas and, on the other side, absorbs heat thereon and is evaporated into high-temperature saturated steam to drive expansion turbine for power generation, and then the refrigeration medium of the last stage is cooled down and depressurized after turbining and enters into condensing space at the end of last stage refrigeration cycle to be reliquefied; At the same time, with the use of the fully liquefied clean gas in the industrial waste gas as medium, it absorbs heat from hot waste gas continuously entering into high temperature stage and evaporates into high-pressure steam to drive expansion turbine for electric power generation, the high-pressure clean gas are depressurized, cooled down and discharged freely after passing the expansion turbine; At the same time, the initial cooled industrial waste gas flow after rapid heat exchanged with deep refrigerating clean gas is being mechanically compressed to increase its density and temperature for providing heat in rapid evaporation of the refrigeration medium of the last stage into high-temperature saturated steam; At the same time, with the use of the pressure difference between a negative pressure generated in rapid cooling of hot industrial waste gas flow after being introduced into rear part and the normal pressure of the hot industrial waste gas flow before being introduced into rear part, and with the use of a work energy formed between the pressure difference and hot industrial waste gas flow, a mechanical motion is generated via wind turbine for the kinetic energy complement in the process of mechanical compression of the initial cooled industrial waste gas flow.

2. A apparatus of refrigeration purification and power generation of industrial waste gas, wherein a front part of which is comprised of double stages or above multi-stage refrigeration cycle of the pure-phase changeable non-heating refrigeration technique, high efficiency deep cool quantity being prepared by the apparatus of the pure-phase changeable non-heating refrigeration, characterizing in that, a rear part of which is comprised of a rear insulating pressure vessel, a medium pump, heat exchangers mounted in the rear insulating pressure vessel as same as those in the last stage refrigeration cycles of the front part, motor, a axial flow wind turbine, a centrifugal air compressor, dust and smoke collectors and liquid waste gas collectors, and expansion turbine groups and a electric power generator group; A isolation layer is provided in the mid of said rear insulating pressure vessel where the upper side of the isolator layer is a negative pressure cooling region and the lower side of the isolator layer is a pressurized cooling region; Said heat exchangers are respectively installed inside the negative pressure cooling region and the pressurized cooling region, the motor being transmission-linked to the centrifugal air compressor and the axial flow wind turbine via coupling shaft; Said axial flow wind turbine is installed in an inlet of the negative pressure-cooling region and a first dust and smoke collector is further mounted at the inlet, hot industrial waste gas being introduced into the rear part insulating pressure vessel to drive blades of the axial flow wind turbine for centrifugal separating the dust and smoke which is initially collected; Said centrifugal air compressor is installed on the isolation layer, namely, mounted on an inlet of the pressurized cooling region, a second dust and smoke collector being further mounted at the inlet, dust and smoke being centrifugal separated and collected again; Said liquid waste gas collectors are respectively provided in the interspace of the heat exchangers inside the negative pressure cooling region and the pressurized cooling region so that the condensed and liquefied toxic and harmful constituents are respectively collected as raw material where oxygen and nitrogen constituents in the waste gas are finally condensed as liquid and stored at the bottom of the pressurized cooling region of rear part insulating pressure vessel; Said medium pump is connected to an inlet pipe of the heat exchanger in the negative pressure-cooling region via a first insulating pressure pipe, an outlet pipe of the heat exchanger in the negative pressure-cooling region being connected to the first expansion turbine group via a second insulating pressure pipe, an inlet pipe of the heat exchanger in the pressurized cooling region being connected to medium pump in the front part last stage of refrigeration cycle via a medium delivery pipe, an outlet pipe of the heat exchanger in the pressurized cooling region being connected to the second expansion turbine group via an insulating return pipe; Said first and second expansion turbine groups are respectively linked to the electric power generator group via coupling shafts, another end of the first expansion turbine group being a clean gas outlet where an another end of the second expansion turbine group being connected to refrigerating space in the front part last stage of refrigeration cycle via a second insulating return pipe.

3. A apparatus of refrigeration purification and power generation of industrial waste gas as claim 2 characterizing in that the liquid waste gas collectors are two or more layers alternating-arranged liquid waste gas collecting plates.

* * * * *

UNITED STATES PATENT AND TRADEMARK OFFICE
CERTIFICATE OF CORRECTION

PATENT NO. : 6,223,558 B1
DATED : May 1, 2001
INVENTOR(S) : Yuanming Yi

It is certified that error appears in the above-identified patent and that said Letters Patent is hereby corrected as shown below:

Column 1,
Line 49, after "refrigeration;" start new paragraph
Line 58, after "material;" start new paragraph Column 2,
Line 3, after "relinquefied;" start new paragraph
Line 10, after "turbine;" start new paragraph
Line 15, after "steam;" start new paragraph
Line 18, delete "gas"
Line 32, after "refrigeration;" start new paragraph
Line 39, after "group" start new paragraph
Line 58, after "again;" start new paragraph
Line 66, after "vessel;" start new paragraph Column 4,
Line 10, replace "pipe10' " with -- pipe 10' --

Column 5,
Line 17, replace "pipe10' " with -- pipe 10' --

Column 7,
Line 5, after "material;" start new paragraph
Line 17, after "reliquefied;" start new paragraph
Line 24, after "turbine;" start new paragraph
Line 30, after "steam;" start new paragraph Column 8,
Line 1, after "group;" start new paragraph
Line 1, replace "A" with -- a --
Line 5, after "region" start new paragraph
Line 5, replace "Said" with -- said --
Line 10, after "shaft;" start new paragraph
Line 10, replace "Said" with -- said --
Line 16, after "collected;" start new paragraph
Line 16, replace "Said" with -- said --
Line 20, after "again;" start new paragraph

UNITED STATES PATENT AND TRADEMARK OFFICE
CERTIFICATE OF CORRECTION

PATENT NO. : 6,223,558 B1
DATED : May 1, 2001
INVENTOR(S) : Yuanming Yi

It is certified that error appears in the above-identified patent and that said Letters Patent is hereby corrected as shown below:

Column 8 contd.
Line 28, after "vessel;" start new paragraph
Line 28, replace "Said" with -- said --
Line 39, after "pipe" start new paragraph
Line 39, replace "Said" with -- said --

Signed and Sealed this

Fifth Day of March, 2002

Attest:

JAMES E. ROGAN
*Attesting Officer*     *Director of the United States Patent and Trademark Office*